Patented Sept. 15, 1953

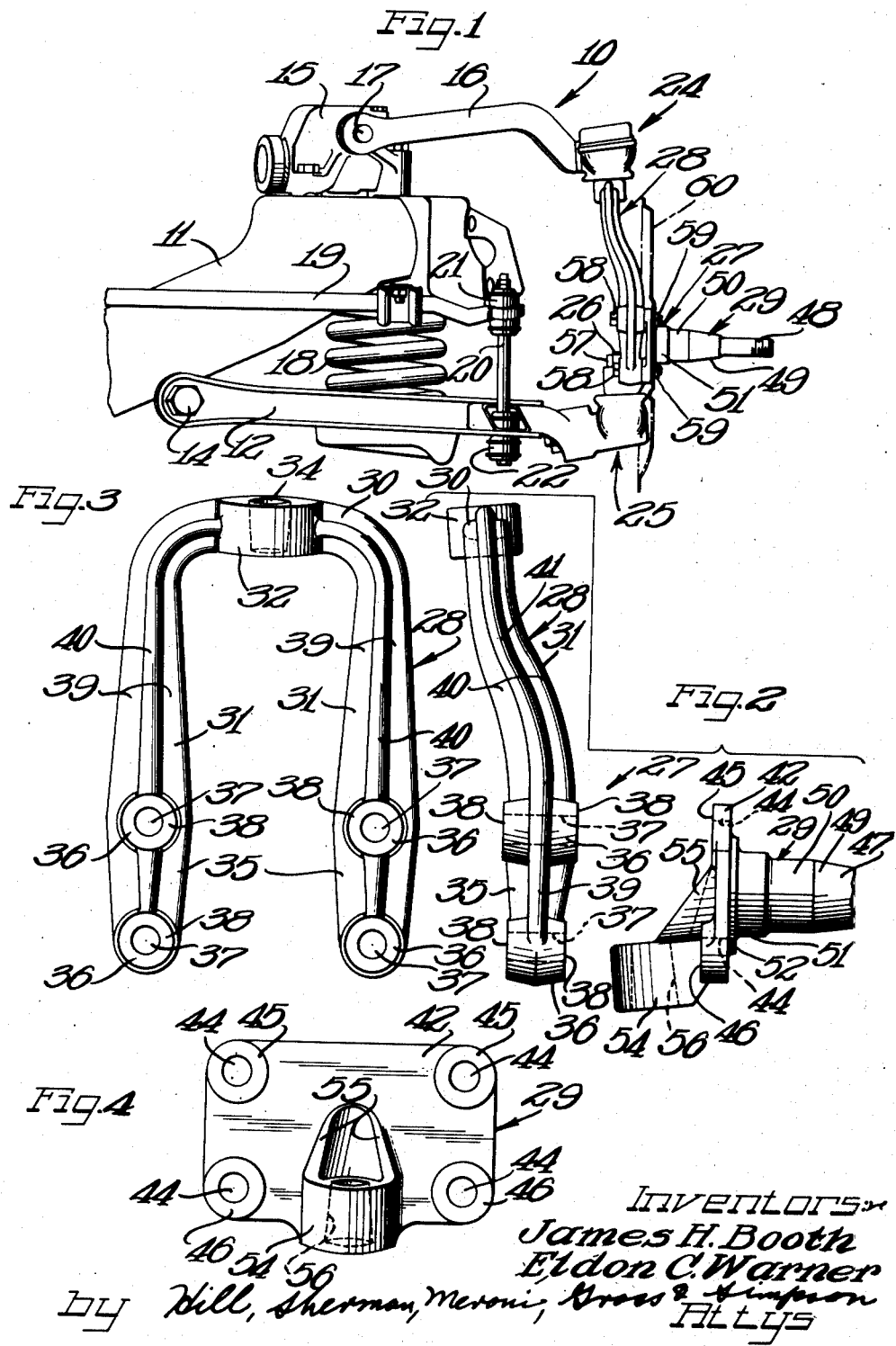

2,652,264

UNITED STATES PATENT OFFICE 2,652,264

STEERING KNUCKLE

James H. Booth, Corunna, and Eldon C. Warner, Detroit, Mich., assignors to Thompson Products, Inc., Cleveland, Ohio, a corporation of Ohio Application April 3, 1951, Serial No. 219,049

5 Claims. (Cl. 280—96.2)

The present invention relates to an improved steering knuckle construction for use in an independent steerable wheel suspension in a vehicle. More particularly, the invention relates to a simplified two-piece steering knuckle assembly including a spindle support bridge having means for connection to the upper wheel suspension control arm and a separable wheel support spindle structure including an integral spindle shank and means for connecting said structure to the lower control arm of the wheel suspension.

In the automotive wheel suspension art, simplicity of construction together with durability is very important. Furthermore, the arrangement must permit of easy assembly and disassembly of associated parts in order to expedite the original assembly operations and to allow for inexpensive maintenance.

According to the present invention an independent steerable wheel suspension, including upper and lower control arms pivotally mounted on an automobile frame and ball joints provided at the outer ends of the control arms, has a steering knuckle fixedly attached to the studs of the ball joints for pivoting movement relative to the control arms. The spindle support portion of the steering knuckle comprises a generally U-shaped bar having an attachment boss integrally formed in the central portion thereof for fixedly connecting to the upper ball joint stud. Connection sections are provided at the free end portions of the legs for receiving bolts or the like to fixedly attach the connection sections to an attachment pad integrally formed on a wheel support spindle structure. The spindle structure includes an integral outwardly extending spindle shank for receiving a vehicle wheel and an integral inwardly extending lower boss portion for fixedly securing the spindle structure to the stud of the lower ball joint.

The U-shaped support bridge is particularly adapted for forging from elongated steel bar stock or rod stock. The bar shank comprises generally two pairs of transversely oppositely extending reinforcement ribs to reduce the total amount of material needed while still giving the required strength with a shape which is readily adapted to forging. The U-shaped construction of the support bridge allows for ready access to the opposing face of a brake backing plate in order to permit removal or insertion of bolts or screws which might be used for attaching or adjusting parts of the brake mechanism.

It is, therefore, an object of the present invention to provide an improved steering knuckle assembly for use in an independent wheel suspension.

Another object of the invention is to provide a simplified two-piece steering knuckle construction including a spindle structure and a simplified support bridge.

A further object of the invention is to provide simplified means for attaching a U-shaped support bridge to a separable spindle structure in the steering knuckle assembly of an independent wheel suspension.

Still another object of the present invention is to provide an improved spindle support bridge which may be readily formed from elongated bar stock or rod stock.

A still further object of the invention is to provide a steering knuckle assembly in an independent wheel suspension including a U-shaped spindle support bridge with integral means at the free ends thereof for connecting to a spindle structure and integral means in the central portion for connecting to an upper control arm.

Other objects, features and advantages of the present invention will be apparent from the following detailed description of one embodiment, by way of preferred example only, taken in conjunction with the accompanying drawings.

On the drawings:

Figure 1 is a fragmentary front elevational view of an independent steerable wheel suspension including a steering knuckle assembly according to the present invention;

Figure 2 is an enlarged exploded front elevational view of the steering knuckle assembly less the attachment bolts;

Figure 3 is an inside elevational view of the spindle support bridge shown in Figure 2; and Figure 4 is an inside end elevational view of the wheel support spindle construction shown in Figure 2.

As shown on the drawings:

In Figure 1 is shown an independent steerable wheel suspension 10 of an automobile or the like including a cross frame member 11 and a lower control arm or load carrying arm 12 pivotally attached at its inner end portion to the frame member 11 by means of an attachment bolt 14. A shock absorber 15 is fixedly mounted on the upper side of the end portion of the cross frame member 11. An upper control arm 16 is pivotally and operatively attached at its inner end portion to the shock absorber 15 at 17. A coil support spring 18 is operatively disposed between the lower control arm 12 outwardly of the bolt 14 and the cross frame member 11 to resiliently transmit the weight of the automobile body (not shown) from the frame member to the load carrying arm 12 and thence to a wheel (not shown). A torsion rod 19 is connected at one end portion to the lower control arm 12 outwardly of the spring 18 by means of a link 20 and associated attachment means 21 and 22.

A ball joint 24, of the controlled friction shimmy dampening type, has its casing fixedly attached to the outer end portion of the upper control arm 16 and has a stud (not shown) tiltably and rotatably retained in the ball joint with an attachment portion extending downwardly therefrom. An anti-friction load carrying ball joint 25 has its casing fixedly attached at the outer end portion of the lower control arm 12 and has a stud 26 tiltably and rotatably retained in the ball joint with an attachment portion extending upwardly therefrom. The upper and lower studs are in axial alignment.

According to the present invention, a steering knuckle assembly 27 includes a spindle support bridge 28 and a separable wheel support spindle structure 29, both preferably formed of forged steel or the like.

The support bridge 28 is of an inverted U-shaped construction having a central portion, or bight 30, and a pair of downwardly extending integral legs 31, 31. An integral generally cylindrically shaped upper attachment boss 32 is formed in the central portion 30 with a tapered aperture or hole 34 extending therethrough generally parallel to the plane of the legs 31. The tapered hole 34 is adapted to receive a mating tapered portion of the stud (not shown) of the upper ball joint 24, with the stud locked therein by means of a nut or the like (not shown). Connection or attachment sections 35, 35 are provided at the free end portions of the legs 31 and herein comprise a pair of longitudinally spaced attachment bosses 36 having bolt receiving apertures 37 therethrough extending substantially perpendicularly to the plane of the legs 31. The bosses 36 are provided with opposite flat end faces 38 at right angles to the axes of the bolt apertures 37. The legs 31 and the central portion 30 are of ribbed construction having a pair of longitudinal co-planar oppositely formed reinforcement ribs 39, 39 and a pair of longitudinal perpendicularly oppositely extending reinforcement ribs 40, 40, so that the shanks have generally X-shaped cross sections. As shown in Figures 1 and 2 a shallow S-shaped bend 41 is provided in each of the legs 31 so that the attachment sections 35 are offset outwardly with respect to the central portion 30.

It will be noted that both the overall configuration and the cross-sectional shape of the support bridge 28 are particularly adapted for forming by forging operations performed on an elongated steel bar or rod. A minimum amount of material is required while a maximum strength is provided. The support bridge can be formed as a straight forging and bent while hot to the finished U-shape or can be finish forged as shown. A minimum amount of finish machining is required.

The wheel support spindle structure 29 includes an integral attachment pad 42 having four bolt receiving apertures 44 therethrough in the same pattern as the bolt receiving apertures 37 formed in the support bridge 28. Integral annular bearing pads or embossments 45 and 46 are formed about the upper and lower pairs of bolt apertures 44, respectively, with the lower embossments 46 being of greater height to compensate for a difference in length between the upper and lower pairs of attachment bosses 36 formed on the support bridge 28. An integral spindle shank 47 extends perpendicularly outwardly from the attachment pad 42 and includes a reduced diameter threaded end portion 48, a tapered portion 49, a cylindrical shank portion 50 and an inward increased diameter cylindrical shank portion 51. An integral annular embossment 52 is provided between the shank portion 51 and the outward face of the attachment pad 42. An integral lower attachment boss 54 is formed inwardly from the inward face of the attachment pad 42 and is provided with a pair of reinforcement webs 55 extending between the upper surface of the lower boss 54 and the inward surface of the attachment pad 42. A tapered aperture or hole 56 is provided through the boss 54 in a direction generally parallel to the attachment pad 42 and is adapted for fixedly receiving a mating tapered portion (not shown) formed on the lower ball joint stud 26 with the stud portion fixedly retained therein by means of a nut 57.

For fixedly attaching the support bridge 28 to the spindle structure 29, bolts 58 extend through the bolt apertures 37 and 44 and are fixedly retained therein by means of nuts 59.

For providing means for attaching a braking mechanism (not shown) for the wheel structure (not shown) a brake backing plate 60 is secured against the outward face of the spindle structure attachment pad 42 by means of the bolts 58 and the nuts 59. Because of the U-shaped construction of the support bridge 28 ready access to the opposing face of the brake backing plate 60 is provided to allow for ready adjustment or removal of brake mechanism screws, bolts or the like (not shown) without the necessity of removing the brake backing plate from the steering knuckle assembly and without the use of a special wrench or the like.

From the above description it will be readily understood that the present invention provides an improved and simplified steering knuckle assembly for use in an independent steerable wheel suspension for a vehicle. The steering knuckle assembly is of two-piece construction with an improved U-shaped spindle support bridge including integral upper ball joint connection means and integral attachment sections for fixedly securing the bridge to an integral attachment pad formed on a wheel support spindle structure. The spindle structure portion of the steering knuckle includes the integral attachment pad, an integral perpendicularly outwardly extending spindle shank and an integral inwardly extending lower ball joint attachment boss. Both portions of the steering knuckle assembly are adapted for expeditious forming by forging operations. The support bridge is readily and easily forgeable from elongated bar stock or rod stock. The resultant bridge utilizes a minimum of material while being of exceptionally strong, durable construction. The U-shape of the support bridge allows for ready access to the opposing face of a brake backing plate attached to the steering knuckle assembly.

It will be understood that modifications and variations may be effected without departing from the scope of the novel concepts of the present invention.

We claim as our invention:

1. In an independent steerable wheel suspension including pivotally mounted upper and lower control arms having ball joints attached at the outer ends thereof with studs rotatably and tiltably retained in the ball joints, a steering knuckle assembly for supporting a wheel and braking mechanism including a brake backing plate, said steering knuckle assembly comprising a spindle support bridge of inverted U-shape having a generally horizontal central portion provided with an integral cylindrical upper boss and two integral generally vertical legs provided with attachment sections at the free end portions thereof outwardly offset with respect to the central portion, each of said attachment sections including a plurality of integral bosses with bolt receiving apertures therethrough generally perpendicular to the plane of the legs, a wheel support spindle structure including an attachment pad with an integral spindle shank extending perpendicularly from one face thereof and an integral lower boss formed on the other face, said pad having a plurality of bolt receiving apertures therethrough arranged in the same pattern as the bolt receiving apertures in said support bridge, and pin means in the bolt apertures of said bridge and said spindle structure for fixedly attaching the attachment sections against said pad other face, said upper and lower bosses having axially aligned tapered holes therethrough for fixedly receiving the studs of said ball joints to pivotally attach the steering knuckle assembly to said upper and lower control arms, the space between said legs providing a relatively large opening for ready access to the face of said brake backing plate opposing said support bridge.

2. In an independent steerable wheel suspension including pivotally mounted upper and lower control arms having ball joints attached at the outer ends thereof with studs rotatably and tiltably retained in the ball joints, a steering knuckle assembly comprising a spindle support bridge of inverted U-shape having an integral generally cylindrical upper boss formed in the central portion thereof and two spaced integral bosses forming an attachment section at the free end portion of each of the legs, said upper boss having a tapered hole therethrough for fixedly receiving the stud of said upper arm ball joint with the axis generally parallel to the plane of the legs, said other bosses having bolt receiving apertures therethrough generally perpendicular to the plane of the legs, a wheel support spindle structure including an attachment pad with an integral spindle shank extending perpendicularly from one face thereof and an integral lower boss formed from the other face, said pad having four bolt receiving apertures therethrough arranged in the same pattern as the bolt receiving apertures in said support bridge, and pin means in the bolt receiving apertures of said bridge and said spindle structure for fixedly attaching the attachment sections against said pad other face, said lower boss having a tapered hole therethrough for fixedly receiving the stud of said lower arm ball joint in axial alignment with the tapered hole through said upper boss.

3. In an independent steerable wheel suspension including pivotally mounted upper and lower control arms having ball joints attached at the outer ends thereof with studs rotatably and tiltably retained in the ball joints, a steering knuckle assembly comprising a spindle support bridge of inverted U-shape having an integral upper boss formed in the central portion thereof and an attachment section at the free end portion of each of the legs, said boss having a tapered hole therethrough for fixedly receiving the stud of said upper arm ball joint with the axis generally in the plane of the legs, a wheel support spindle structure including an attachment pad with an integral spindle shank extending perpendicularly from one face thereof and an integral lower boss formed from the other face, and means fixedly securing said bridge attachment sections to said spindle attachment pad against said other face, said lower boss having a tapered hole therethrough for fixedly receiving the stud of said lower arm ball joint in axial alignment with the tapered hole through said upper boss.

4. In an independent steerable wheel suspension including pivotally mounted upper and lower control arms having ball joints attached at the outer ends thereof, a steering knuckle assembly comprising a spindle support bridge of inverted U-shape having an integral upper boss formed in the central portion thereof and an attachment section at the free end portion of each of the legs, a wheel support spindle structure including an attachment pad with an integral spindle shank extending perpendicularly from one face thereof and an integral lower boss formed from the other face, means fixedly securing said bridge attachment sections to said spindle attachment pad against said other face, and means pivotally connecting said upper and lower bosses to said upper and lower control arms through the ball joints connected thereto.

5. In an independent steerable wheel suspension including pivotally mounted upper and lower control arms having ball joints attached at the outer ends thereof, a steering knuckle assembly comprising a spindle support bridge of inverted U-shape, a wheel support spindle structure including an integral spindle shank extending outwardly therefrom, means for fixedly securing the free end portions of the legs of said bridge to said spindle structure with the axis of the spindle shank generally perpendicular to the plane of the legs, and means pivotally connecting the central portion of said bridge and the inward portion of said spindle structure to said upper and lower control arms, respectively, through the ball joints connected thereto.

JAMES H. BOOTH.
ELDON C. WARNER.

References Cited in the file of this patent
UNITED STATES PATENTS

| Number | Name | Date |
|---|---|---|
| 2,155,521 | Zavarella | Apr. 25, 1939 |
| 2,532,034 | Pawsat et al. | Nov. 28, 1950 |